United States Patent
Kono et al.

(10) Patent No.: US 10,392,453 B2
(45) Date of Patent: Aug. 27, 2019

(54) PRODUCTION METHOD FOR OLEFIN-POLYMERIZATION CATALYST AND PRODUCTION METHOD FOR OLEFIN POLYMER

(71) Applicant: TOHO TITANIUM CO., LTD., Chigasaki-shi, Kanagawa (JP)

(72) Inventors: Hiroyuki Kono, Chigasaki (JP); Toshiya Uozumi, Chigasaki (JP); Shingo Yamada, Chigasaki (JP); Toshihiko Sugano, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 15/542,723

(22) PCT Filed: Jan. 18, 2016

(86) PCT No.: PCT/JP2016/051266
§ 371 (c)(1),
(2) Date: Jul. 11, 2017

(87) PCT Pub. No.: WO2016/121549
PCT Pub. Date: Aug. 4, 2016

(65) Prior Publication Data
US 2017/0369608 A1 Dec. 28, 2017

(30) Foreign Application Priority Data
Jan. 30, 2015 (JP) .................................. 2015-017404

(51) Int. Cl.
C08F 110/06 (2006.01)
C08F 4/654 (2006.01)
C08F 10/00 (2006.01)

(52) U.S. Cl.
CPC ............ C08F 110/06 (2013.01); C08F 4/654 (2013.01); C08F 10/00 (2013.01)

(58) Field of Classification Search
CPC .................................................. C08F 110/06
See application file for complete search history.

(56) References Cited

U.S. PATENT DOCUMENTS

| | | | |
|---|---|---|---|
| 2010/0190942 A1* | 7/2010 | Hosaka | C07F 7/10 526/128 |
| 2010/0273641 A1* | 10/2010 | Chen | C08F 110/06 502/126 |
| 2012/0004378 A1* | 1/2012 | Hosaka | C08F 10/00 526/123.1 |
| 2014/0221583 A1 | 8/2014 | Uozumi et al. | |
| 2014/0275452 A1* | 9/2014 | Chang | C08F 110/06 526/124.9 |
| 2014/0343237 A1 | 11/2014 | Sugano et al. | |
| 2016/0009836 A1 | 1/2016 | Sugano et al. | |
| 2018/0362673 A1* | 12/2018 | Fukuda | C08F 110/06 |

FOREIGN PATENT DOCUMENTS

| | | |
|---|---|---|
| CN | 103923238 A | 7/2014 |
| JP | 3-234707 A | 10/1991 |
| WO | 2008/120795 A1 | 10/2008 |
| WO | 2013/005463 A1 | 1/2013 |
| WO | 2013/042400 A1 | 3/2013 |
| WO | 2014/132759 A1 | 9/2014 |

OTHER PUBLICATIONS

International Search Report dated Mar. 1, 2016, issued in counterpart application No. PCT/JP2016/051266 w/ English translation. (5 pages).
Written Opinion dated Mar. 1, 2016, issued in counterpart International Application No. PCT/JP2016/051266 (4 pages).
Office Action dated May 21, 2019 issued in counterpart CN Application No. 201680007936.4, with English translation (12 pages).

* cited by examiner

*Primary Examiner* — Catherine S Branch
(74) *Attorney, Agent, or Firm* — Westerman, Hattori, Daniels & Adrian, LLP

(57) ABSTRACT

A method for producing an olefin polymerization catalyst includes bringing a solid catalyst component for olefin polymerization, a vinylsilane compound, an organosilicon compound, and an organoaluminum compound into contact with each other in an inert organic solvent under an inert gas atmosphere in the absence of a specific vinyl compound, wherein a washing treatment is not performed after the vinylsilane compound has been added to the reaction system, the solid catalyst component includes a magnesium compound, a titanium halide compound, and an electron donor compound that does not include a phthalic acid ester structure, and includes a diol skeleton, and the organosilicon compound does not include a vinyl group, and includes at least one group selected from an alkoxy group and an amino group.

14 Claims, No Drawings

PRODUCTION METHOD FOR OLEFIN-POLYMERIZATION CATALYST AND PRODUCTION METHOD FOR OLEFIN POLYMER

TECHNICAL FIELD

The present invention relates to a method for producing an olefin polymerization catalyst, and a method for producing an olefin polymer.

BACKGROUND ART

A solid catalyst that includes a transition metal catalyst component (e.g., titanium compound) and a main group metal catalyst component (e.g., aluminum compound) has been widely known as an olefin polymerization catalyst.

An olefin polymerization catalyst that utilizes a magnesium compound as a support exhibits remarkably improved polymerization activity. A polymer that exhibits high stereoregularity can be produced from an α-olefin having 3 or more carbon atoms by adding an electron donor compound such as an ester compound to the catalyst.

For example, a technique that treats a solid titanium catalyst component that supports an electron donor compound (e.g., phthalic acid ester) with a vinyl group-containing silicon compound (Patent Literature 1 (JP-A-3-234707)) is known.

However, di-n-butyl phthalate and benzylbutyl phthalate (i.e., phthalic acid ester) are designated as substances of very high concern (SVHC) specified by Registration, Evaluation, Authorization and Restriction of Chemicals (REACH), and a catalyst system that is not so designated has been desired from the viewpoint of a reduction in environmental load.

CITATION LIST

Patent Literature

Patent literature 1: JP-A-03-234707

SUMMARY OF INVENTION

Technical Problem

A solid catalyst component that utilizes a succinic acid ester, a maleic acid ester, a malonic acid ester, an ether compound, or the like (that does not fall under the SVHC) as an electron donor compound is known.

However, since a solid catalyst component that utilizes an electron donor compound that does not fall under the SVHC normally does not exhibit a performance equal to that of a solid catalyst component that utilizes a phthalic acid ester, a further improvement has been desired. In particular, a solid catalyst component that utilizes an electron donor compound that does not fall under the SVHC tends to exhibit significantly decreased activity when used for a polymerization process that includes a process that brings the solid catalyst component into contact with an organoaluminum compound and an external electron donor compound in an inert gas atmosphere (e.g., nitrogen atmosphere).

An organosilicon compound or the like is widely used for an olefin polymerization catalyst as an electron donor compound. The inventors conducted studies, and found that, when only a vinylsilane compound is used as an electron donor compound, it may be difficult to obtain sufficient stereoregularity and activity, and provide a catalyst that is sufficient in terms of activity and stereoregularity. The inventors also found that, when a vinylsilane compound is used as an electron donor compound, the vinylsilane compound easily volatilizes and disappears during drying under reduced pressure when producing a solid catalyst component or a polymerization catalyst, whereby the desired effect may not be obtained.

Moreover, an olefin polymerization catalyst that can produce an olefin polymer that has a low fine powder content and a low coarse powder content, can suppress adhesion of a polymer powder to a polymerization reactor during polymerization, has been desired.

In view of the above situation, an object of the invention is to provide a method for producing an olefin polymerization catalyst that can produce an olefin polymerization catalyst that exhibits excellent catalytic activity during polymerization, and can produce an olefin polymer that exhibits excellent stereoregularity and excellent bulk density, and has a particle size distribution in which the fine powder content and the coarse powder content are reduced, even when an electron donor compound other than a phthalic acid ester is used, and a method for producing an olefin polymer that can easily and inexpensively produce an olefin polymer using an olefin polymerization catalyst produced using the above method.

Solution to Problem

The inventors conducted extensive studies in order to solve the above technical problem. As a result, the inventors found that the above technical problem can be solved by a method for producing an olefin polymerization catalyst including bringing a solid catalyst component for olefin polymerization, a vinylsilane compound, an organosilicon compound, and an organoaluminum compound into contact with each other in an inert organic solvent under an inert gas atmosphere in the absence of a compound represented by the general formula (I): $CH_2=CH-R^1$ (wherein $R^1$ is a hydrogen atom or a hydrocarbon residue having 1 to 20 carbon atoms), wherein a washing treatment is not performed after the vinylsilane compound has been added to the reaction system, the solid catalyst component includes a magnesium compound, a titanium halide compound, and an electron donor compound that does not include a phthalic acid ester structure, and includes a diol skeleton, and the organosilicon compound does not include a vinyl group, and includes at least one group selected from an alkoxy group and an amino group. This finding has led to the completion of the invention.

Specifically, several aspects of the invention provide the following.

(1) A method for producing an olefin polymerization catalyst including bringing a solid catalyst component for olefin polymerization, a vinylsilane compound, an organosilicon compound, and an organoaluminum compound into contact with each other in an inert organic solvent under an inert gas atmosphere in the absence of a compound represented by the following general formula (I), wherein a washing treatment is not performed after the vinylsilane compound has been added to the reaction system, the solid catalyst component includes a magnesium compound, a titanium halide compound, and an electron donor compound that does not include a phthalic acid ester structure, and includes a diol skeleton, and the organosilicon compound does not include a vinyl group, and includes at least one group selected from an alkoxy group and an amino group, $$CH_2=CH-R^1 \qquad (I)$$

wherein R¹ is a hydrogen atom or a hydrocarbon residue having 1 to 20 carbon atoms.

(2) The method for producing an olefin polymerization catalyst according to (1), wherein the electron donor compound that does not include a phthalic acid ester structure, and includes a diol skeleton, is a first electron donor compound that does not include a phthalic acid ester structure, and includes a diol skeleton, and the solid catalyst component for olefin polymerization further includes a second electron donor compound as the electron donor compound, the second electron donor compound not including a phthalic acid ester structure and a diether structure, and including two or more electron donor groups selected from an ester group, an ether group, a carbonate group, and an amino group.

(3) The method for producing an olefin polymerization catalyst according to (1), wherein the electron donor compound that does not include a phthalic acid ester structure, and includes a diol skeleton, is a first electron donor compound that does not include a phthalic acid ester structure, and includes a 1,3-diether structure, and the solid catalyst component for olefin polymerization further includes a second electron donor compound as the electron donor compound, the second electron donor compound not including a phthalic acid ester structure and a diether structure, and including two or more electron donor groups selected from an ester group, an ether group, a carbonate group, and an amino group.

(4) The method for producing an olefin polymerization catalyst according to (2) or (3), wherein the first electron donor compound is one or more compounds selected from a 2,2-dialkyl-1,3-dialkoxypropane and 9,9-bis(methoxymethyl)fluorene.

(5) The method for producing an olefin polymerization catalyst according to any one of (1) to (4), wherein the solid catalyst component for olefin polymerization, the vinylsilane compound, the organosilicon compound, and the organoaluminum compound are brought into contact with each other in the inert organic solvent at a temperature of 50° C. or less and a catalyst concentration of 1 g/L or more for 1 minute or more.

(6) The method for producing an olefin polymerization catalyst according to any one of (1) to (5), wherein the vinylsilane compound is a compound represented by the following general formula (II),

$(CH_2=CH-)SiR^2R^3R^4$ (II)

wherein $R^2$, $R^3$, and $R^4$ are independently a halogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are either identical to or different from each other.

(7) The method for producing an olefin polymerization catalyst according to any one of (1) to (6), wherein the vinylsilane compound is used in a 0.1 to 15-fold molar quantity with respect to the molar quantity (on a titanium atom basis) of the titanium halide compound included in the solid catalyst component.

(8) A method for producing an olefin polymer including bringing an olefin polymerization catalyst produced using the method for producing an olefin polymerization catalyst according to any one of (1) to (7) into contact with one or more compounds selected from compounds represented by the following general formula (I),

$CH_2=CH-R^1$ (I)

wherein R¹ is a hydrogen atom or a hydrocarbon residue having 1 to 20 carbon atoms.

Several aspects of the invention preferably provide the following.

(1)' A method for producing an olefin polymerization catalyst including bringing a solid catalyst component for olefin polymerization, a vinylsilane compound, an organosilicon compound, and an organoaluminum compound into contact with each other in an inert organic solvent under an inert gas atmosphere in the absence of a compound represented by the following general formula (I), wherein a washing treatment is not performed after the vinylsilane compound has been added to the reaction system, the solid catalyst component includes a magnesium compound, a titanium halide compound, and an electron donor compound that does not include a phthalic acid ester structure, and includes a dial skeleton, and the organosilicon compound does not include a vinyl group, and includes at least one group selected from an alkoxy group and an amino group,

$CH_2=CH-R^1$ (I)

wherein R¹ is a hydrogen atom or a hydrocarbon residue having 1 to 20 carbon atoms.

(2)' The method for producing an olefin polymerization catalyst according to (1)', wherein the electron donor compound that does not include a phthalic acid ester structure, and includes a diol skeleton, is a first electron donor compound that does not include a phthalic acid ester structure, and includes a diol skeleton, and the solid catalyst component for olefin polymerization further includes a second electron donor compound as the electron donor compound, the second electron donor compound not including a phthalic acid ester structure and a diether structure, and including two or more electron donor groups selected from an ester group, an ether group, a carbonate group, and an amino group.

(3)' The method for producing an olefin polymerization catalyst according to (1)', wherein the electron donor compound that does not include a phthalic acid ester structure, and includes a diol skeleton, is a first electron donor compound that does not include a phthalic acid ester structure, and includes a 1,3-diether structure, and the solid catalyst component for olefin polymerization further includes a second electron donor compound as the electron donor compound, the second electron donor compound not including a phthalic acid ester structure and a diether structure, and including two or more electron donor groups selected from an ester group, an ether group, a carbonate group, and an amino group.

(4)' The method for producing an olefin polymerization catalyst according to (2)', wherein the first electron donor compound is one or more compounds selected from a 2,2-dialkyl-1,3-dialkoxypropane and 9,9-bis(methoxymethyl)fluorene.

(5)' The method for producing an olefin polymerization catalyst according to (3)', wherein the first electron donor compound is one or more compounds selected from a 2,2-dialkyl-1,3-dialkoxypropane and 9,9-bis(methoxymethyl)fluorene.

(6)' The method for producing an olefin polymerization catalyst according to (1)', wherein the solid catalyst component for olefin polymerization, the vinylsilane compound, the organosilicon compound, and the organoaluminum compound are brought into contact with each other in the inert organic solvent at a temperature of 50° C. or less and a catalyst concentration of 0.1 g/L or more for 1 minute or more.

(7)' The method for producing an olefin polymerization catalyst according to (1)', wherein the vinylsilane compound is a compound represented by the following general formula (II), $$(CH_2=CH—)SiR^2R^3R^4 \qquad (II)$$

wherein $R^2$, $R^3$, and $R^4$ are independently a halogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are either identical to or different from each other.

(8)' The method for producing an olefin polymerization catalyst according to (1)", wherein the vinylsilane compound is used in a 0.1 to 15-fold molar quantity with respect to the molar quantity (on a titanium atom basis) of the titanium halide compound included in the solid catalyst component.

(9)' A method for producing an olefin polymer including bringing an olefin polymerization catalyst produced using the method for producing an olefin polymerization catalyst according to any one of (1)' to (8)' into contact with one or more compounds selected from compounds represented by the following general formula (I), $$CH_2=CH—R^1 \qquad (I)$$

wherein $R^1$ is a hydrogen atom or a hydrocarbon residue having 1 to 20 carbon atoms.

Advantageous Effects of Invention

Since an olefin polymerization catalyst produced using the method for producing an olefin polymerization catalyst according to one aspect of the invention includes the organosilicon compound and the vinylsilane compound, it is possible to effectively improve the polymerization activity due to an electronic effect with respect to the vinyl group of the vinylsilane compound and the Ti active sites, although the solid catalyst component for olefin polymerization includes an electron donor compound other than a phthalic acid ester. Moreover, the vinyl group of the vinylsilane compound protects the Ti active sites of the solid catalyst component, and suppresses a situation in which the organoaluminum reacts with the Ti active sites to a large extent, so that aggregation of the polymer particles rarely occurs. This makes it possible to effectively reduce production of a fine powder that may occur when the aggregates of the polymer particles break, and effectively reduce adhesion of the polymer powder to a polymerization reactor, while ensuring that the resulting polymer exhibits high stereoregularity and high bulk density.

Since the method for producing an olefin polymerization catalyst according to one aspect of the invention does not perform a washing treatment after the vinylsilane compound has been added to the reaction system when the solid catalyst component for olefin polymerization, the vinylsilane compound, the organosilicon compound, and the organoaluminum compound are brought into contact with each other in the inert organic solvent to produce an olefin polymerization catalyst, it is possible to suppress removal (elution) of the vinylsilane compound (soluble component). Since it is unnecessary to perform drying under reduced pressure (that is normally performed after a washing treatment), it is possible to suppress a situation in which the vinylsilane compound volatilizes and disappears. Therefore, the above advantageous effects can be more effectively achieved.

The aspects of the invention can thus provide a method for producing an olefin polymerization catalyst that can produce an olefin polymerization catalyst that exhibits excellent catalytic activity during polymerization, and can produce an olefin polymer that exhibits excellent stereoregularity and excellent bulk density, and has a particle size distribution in which the fine powder content and the coarse powder content are reduced, even when an electron donor compound other than a phthalic acid ester is used, and a method for producing an olefin polymer that can easily and inexpensively produce an olefin polymer using an olefin polymerization catalyst produced using the above method.

DESCRIPTION OF EMBODIMENTS

A method for producing an olefin polymerization catalyst according to one embodiment of the invention is described below.

The method for producing an olefin polymerization catalyst according to one embodiment of the invention includes bringing a solid catalyst component for olefin polymerization, a vinylsilane compound, an organosilicon compound, and an organoaluminum compound into contact with each other in an inert organic solvent under an inert gas atmosphere in the absence of a compound represented by the following general formula (1), wherein a washing treatment is not performed after the vinylsilane compound has been added to the reaction system, the solid catalyst component includes a magnesium compound, a titanium halide compound, and an electron donor compound that does not include a phthalic acid ester structure, and includes a diol skeleton, and the organosilicon compound does not include a vinyl group, and includes at least one group selected from an alkoxy group and an amino group, $$CH_2=CH—R^1 \qquad (I)$$

wherein $R^1$ is a hydrogen atom or a hydrocarbon residue having 1 to 20 carbon atoms.

The magnesium compound included in the solid catalyst component for olefin polymerization that is used in connection with the method for producing an olefin polymerization catalyst according to one embodiment of the invention is not particularly limited. A known magnesium compound may be used.

For example, the magnesium compound may be one or more magnesium compounds selected from a magnesium dihalide, a dialkylmagnesium, azo alkylmagnesium halide, a dialkoxymagnesium, a diaryloxymagnesium, an alkoxymagnesium halide, a fatty acid magnesium salt, and the like.

Among these, a magnesium dihalide, a mixture that includes a magnesium dihalide and a dialkoxymagnesium, and a dialkoxymagnesium (particularly a dialkoxymagnesium) are preferable. Specific examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. It is particularly preferable to use diethoxymagnesium.

The dialkoxymagnesium may be produced by reacting magnesium metal with an alcohol in the presence of a halogen-containing organic metal compound or the like.

The dialkoxymagnesium may be in the form of granules or a powder, and may have an indefinite shape or a spherical shape. For example, when a spherical dialkoxymagnesium is used, a polymer powder that has a better particle shape and a narrow particle size distribution is easily obtained. Therefore, it is possible to improve the handling capability of the polymer powder during polymerization, and easily eliminate a problem (e.g., a situation in which a filter provided to a polymer separator is clogged by a fine polymer powder).

The spherical dialkoxymagnesium need not necessarily have a perfectly spherical shape, but may have an elliptical shape or a potato-like shape. It is preferable that the spherical dialkoxymagnesium have a ratio (L/W) of the major axis (L) to the minor axis (W) of 3 or less, more preferably 1 to 2, and still more preferably 1 to 1.5.

It is preferable that the dialkoxymagnesium have an average particle size of 1 to 200 μm, and more preferably 5 to 150 μm.

When the dialkoxymagnesium has a spherical shape, it is preferable that the dialkoxymagnesium have an average particle size of 1 to 100 μm, more preferably 5 to 80 μm, and still more preferably 10 to 60 μm.

It is preferable that the dialkoxymagnesium have a low fine powder (particle) content and a low coarse powder (particle) content, and have a narrow particle size distribution. More specifically, it is preferable that the dialkoxymagnesium have a particle size distribution in which the content of particles having a particle size of 5 μm or less is 20% or less, and more preferably 10% or less. It is preferable that the dialkoxymagnesium have a particle size distribution in which the content of particles having a particle size of 100 μm or more is 10% or less, and more preferably 5% or less.

The particle size distribution "D90/D10" (where, D90 is the particle size at 90% in the cumulative volume particle size distribution, and D10 is the particle size at 10% in the cumulative volume particle size distribution) of the dialkoxymagnesium is preferably 3 or less, and more preferably 2 or less.

The spherical dialkoxymagnesium described above may be produced using the method disclosed in JP-A-58-4132, JP-A-62-51633, JP-A-3-74341, JP-A-4-368391, JP-A-8-73388, or the like.

These dialkoxymagnesiums may be used either alone or in combination.

The titanium halide compound included in the solid catalyst component for olefin polymerization that is used in connection with the method for producing an olefin polymerization catalyst according to one embodiment of the invention is not particularly limited. A known titanium halide compound may be used.

For example, the titanium halide compound may be one or more compounds selected from a titanium tetrahalide and an alkoxytitanium halide represented by $Ti(OR^2)_iX_{4-i}$ (wherein $R^2$ is an alkyl group having 1 to 4 carbon atoms, X is a halogen atom, and i is an integer from 0 to 4).

Examples of the titanium halide include a titanium tetrahalide such as titanium tetrachloride, titanium tetrabromide, and titanium tetraiodide. Examples of the alkoxytitanium halide include methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, tri-n-butoxytitanium chloride, and the like.

The titanium halide compound is preferably a titanium tetrahalide, and more preferably titanium tetrachloride.

The electron donor compound (that does not include a phthalic acid ester structure, and includes a diol skeleton) included in the solid catalyst component for olefin polymerization that is used in connection with the method for producing an olefin polymerization catalyst according to one embodiment of the invention is not particularly limited.

Examples of the electron donor compound (that does not include a phthalic acid ester structure, and includes a diol skeleton) that is used in connection with the method for producing an olefin polymerization catalyst according to one embodiment of the invention, include a first electron donor compound that does not include a phthalic acid ester structure, and includes a diol skeleton (hereinafter may be appropriately referred to as "component (D1)") (see below).

Examples of the first electron donor compound (that does not include a phthalic acid ester structure, and includes a diol skeleton) (component (D1)) that is used in connection with the method for producing an olefin polymerization catalyst according to one embodiment of the invention, include a diether, a diol diester, a diol dicarbonate, and a diol ether compound. The first electron donor compound is preferably a 1,3-diether (i.e., a compound that includes a 1,3-diether structure), a diol diester in which the number of carbon atoms between the oxygen atoms is 2 to 4, a diol dicarbonate in which the number of carbon atoms between the oxygen atoms is 2 to 4, a diol ester ether in which the number of carbon atoms between the oxygen atoms is 2 to 4, or a diol ether carbonate in which the number of carbon atoms between the oxygen atoms is 2 to 4.

The 1,3-diether is preferably a compound that includes a fluorene structure, or a compound (structure) that includes two alkyl groups or cycloalkyl groups having 3 to 7 carbon atoms. The 1,3-diether may be one or more compounds selected from a 2,2-dialkyl-1,3-dialkoxypropane, a 2,2-dicycloalkyl-1,3-dimethoxypropane, 2,2-bis(cycloalkylmethyl)-1,3-dimethoxypropane, and 9,9-bis(methoxymethyl)fluorene. The 1,3-diether is preferably one or more compounds selected from 2-isopropyl-2-isobutyl-1,3-dimethoxypropane, 2-isopropyl-2-isopentyl-1,3-dimethoxypropane, and 9,9-bis(methoxymethyl)fluorene, and more preferably one or more compounds selected from a 2,2-dialkyl-1,3-dialkoxypropane and 9,9-bis(methoxymethyl)fluorene.

The diol diester in which the number of carbon atoms between the oxygen atoms is 2 to 4, the diol dicarbonate in which the number of carbon atoms between the oxygen atoms is 2 to 4, the diol ester ether in which the number of carbon atoms between the oxygen atoms is 2 to 4, and the diol ether carbonate in which the number of carbon atoms between the oxygen atoms is 2 to 4, are preferably one or more compounds selected from 2,4-pentanediol dibenzoate, 3-methyl-2,4-pentanediol dibenzoate, 3-methyl-5-t-butyl-1,2-phenylene dibenzoate, 3,5-diisopropyl-1,2-phenylene dibenzoate, 1,8-naphthyl diallyloate, 5-t-butyl 1,2-phenylenediphenyl dicarbonate, 3-methyl 5-t-butyl-1,2-phenylenediethyl carbonate, 2-ethoxyethyl methyl carbonate, 2-ethoxyethyl ethyl carbonate, and 2-benzyloxyethyl phenyl carbonate.

It is preferable that the solid catalyst component for olefin polymerization that is used in connection with the method for producing an olefin polymerization catalyst according to one embodiment of the invention, include the first electron donor compound (component (D1)), and a second electron donor compound that does not include a phthalic acid ester structure and a di ether structure, and includes two or more electron donor groups selected from an ester group, an ether group, a carbonate group, and an amino group (hereinafter may be appropriately referred to as "component (D2)").

The component (D2) may be a compound that does not include a phthalic acid ester structure, and includes a dial skeleton. In this case, the component (D2) may be used in combination with the component (D1) as an electron donor compound that does not include a phthalic acid ester structure, and includes a diol skeleton, or may be used instead of the component (D1) as the electron donor compound that is included in the solid catalyst component for olefin polymerization.

Examples of the second electron donor compound (that does not include a phthalic acid ester structure and a diether structure, and includes two or more electron donor groups selected from an ester group, an ether group, a carbonate group, and an amino group) (component (D2)) that is used in connection with the method for producing an olefin polymerization catalyst according to one embodiment of the invention, include a compound that includes two or more electron donor groups selected from an ester group, an ether group, a carbonate group, and an amino group, and has a structure that differs from that of the first electron donor compound.

When the component (D2) includes an ester group, the component (D2) is preferably an electron donor compound that includes 1 to 3 ester residues, and more preferably one or more compounds selected from a dicarboxylic acid diester that includes two ester residues, a polycarboxylic acid polyester that includes three or more ester residues, an ether-carboxylic acid ester that includes one ester group and one alkoxy group, a polyol ester, a substituted phenylene aromatic diester, and the like.

When the component (D2) that is used in connection with the method for producing an olefin polymerization catalyst according to one embodiment of the invention includes an ester group, the component (D2) is preferably one or more compounds selected from a dicarboxylic acid diester, an ether-carboxylic acid ester, and a diol ester that do not include a phthalic acid ester structure, and more preferably one or more compounds selected from diethyl maleate, diethyl benzylidenemalonate, diethyl 2,3-diisopropylsuccinate, diethyl cyclohexane-1,2-dicarboxylate, di-n-propyl cyclohexane-1,2-dicarboxylate, di-n-butyl cyclohexane-1,2-dicarboxylate, ethyl 3-ethoxy-2-isopropylpropionate, ethyl 3-ethoxy-2-t-butylpropionate, ethyl 3-ethoxy-2-t-pentylpropionate, 2,4-pentanediol dibenzoate, 3-methyl-2,4-pentanediol dibenzoate, 3-methyl-5-t-butyl-1,2-phenylene dibenzoate, and 3,5-diisopropyl-1,2-phenylene dibenzoate.

When the component (D2) that is used in connection with the method for producing an olefin polymerization catalyst according to one embodiment of the invention includes an ether group, the component (D2) may be appropriately selected from a compound that does not include a diether structure.

When the component (D2) that is used in connection with the method for producing an olefin polymerization catalyst according to one embodiment of the invention includes a carbonate group, the component (D2) is preferably a compound that includes 1 to 3 carbonate groups, and may be one or more compounds selected from a carbonate ether that includes one carbonate group and one alkoxy group, a carbonate ester that includes one carbonate group and one ester group, a compound that includes one carbonate group and one carboxy group, a dicarbonate that includes two carbonate groups, a polycarbonate that includes three or more carbonate groups, and the like.

The compound that includes a carbonate group is preferably a carbonate ether, a carbonate ester, or a dicarbonate, and may be one or more compounds selected from 2-ethoxyethyl methyl carbonate, 2-ethoxyethyl ethyl carbonate, 2-propoxyethyl methyl carbonate, 2-benzyloxyethyl phenyl carbonate, and 5-t-butyl-1,2-phenylenediphenyl dicarbonate.

The method for producing an olefin polymerization catalyst according to one embodiment of the invention can produce an olefin polymerization catalyst that exhibits excellent catalytic activity during polymerization, and can produce a polymer that exhibits excellent stereoregularity and bulk density, and has a low fine powder content and a low coarse powder content, by bringing the electron donor compound that does not include a phthalic acid ester structure, and includes a diol skeleton (first electron donor compound (component (D1)) and second election donor compound (component (D2))), the titanium halide compound, the vinylsilane compound, the organosilicon compound, and the organoaluminum compound (described later) into contact with each other.

The solid catalyst component for olefin polymerization that is used in connection with the method for producing an olefin polymerization catalyst according to one embodiment of the invention, may further include a polysiloxane in addition to the above components.

It is possible to easily improve the stereoregularity or the crystallinity of the resulting polymer, and easily reduce the fine powder content in the resulting polymer, by bringing the magnesium compound, the titanium halide compound, the electron donor compound, and a polysiloxane into contact with each other.

A polysiloxane is a polymer that includes a siloxane bond (—Si—O bond) in the main chain, and may be referred to as "silicone oil". The polysiloxane may be a chain-like polysiloxane, a partially hydrogenated polysiloxane, a cyclic polysiloxane, or a modified polysiloxane that is liquid or viscous at room temperature, and has a viscosity at 25° C. of 0.02 to 100 cm$^2$/s (2 to 1,000 cSt).

Examples of the chain-like polysiloxane include dimethylpolysiloxane and methylphenylpolysiloxane. Examples of the partially hydrogenated polysiloxane include methyl hydrogen polysiloxane having a hydrogenation rate of 10 to 80%. Examples of the cyclic polysiloxanes include hexamethylcyclotrisiloxane, octamethylcyclotetrasiloxane, decamethylcyclopentansiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethylsiloxane. Among these, decamethylcyclopentasiloxane and dimethylpolysiloxane are preferable, and decamethylcyclopentasiloxane is particularly preferable.

The solid catalyst component for olefin polymerization that is used in connection with the method for producing an olefin polymerization catalyst according to one embodiment of the invention, is preferably produced by bringing the magnesium compound, the titanium halide compound, the electron donor compound (e.g., first electron donor compound and second electron donor compound) that does not include a phthalic acid ester structure, and includes a diol skeleton, an optional polysiloxane, and the like into contact with each other in the presence of an inert organic solvent.

The inert organic solvent is preferably an inert organic solvent that dissolves the titanium halide compound, but does not dissolve the magnesium compound. The inert organic solvent is preferably one or more compounds selected from a saturated hydrocarbon compound such as pentane, hexane, heptane, octane, nonane, decane, cyclohexane, methylcyclohexane, ethylcyclohexane, 1,2-diethylcyclohexane, methylcyclohexene, decalin, and mineral oil, an aromatic hydrocarbon compound such as benzene, toluene, xylene, and ethylbenzene, a halogenated hydrocarbon compound such as o-dichlorobenzene, methylene chloride, 1,2-dichlorobenzene, carbon tetrachloride, and dichloroethane, and the like.

The inert organic solvent is more preferably a saturated hydrocarbon compound or an aromatic hydrocarbon compound that has a boiling point of about 50 to 200° C. and is liquid at room temperature. More specifically, the inert organic solvent is preferably one or more compounds selected from hexane, heptane, octane, ethylcyclohexane, mineral oil, toluene, xylene, and ethylbenzene.

The solid catalyst component for olefin polymerization may be produced by suspending the magnesium compound, the first electron donor compound (component (D1)), and the second electron donor compound (component (D2)) in an inert organic solvent (e.g., an aromatic hydrocarbon compound having a boiling point of 50 to 200° C.) to prepare a suspension, and bringing a mixed solution that includes the titanium halide compound and an inert organic solvent (e.g., aromatic hydrocarbon compound) into contact with the suspension to effect a reaction.

The solid catalyst component for olefin polymerization may also be produced by suspending the magnesium compound in the titanium halide compound or an inert organic solvent (e.g., aromatic hydrocarbon compound) to prepare a suspension, and bringing the first electron donor compound (component (D1)), the second electron donor compound (component (D2)), and the titanium halide compound (optional) into contact with the suspension to effect a reaction.

A spherical solid catalyst component for olefin polymerization having a sharp particle size distribution can be obtained by utilizing a spherical magnesium compound as the magnesium compound. A spherical solid catalyst component for olefin polymerization having a sharp particle size distribution can also be obtained without using a spherical magnesium compound, by forming particles using a spray drying method that spray-dries a solution or a suspension using a sprayer, for example.

The magnesium compound, the titanium halide compound, the first elect donor compound (component (D1)), and the second electron donor compound (component (D2)) may be brought into contact with each other in an inert gas atmosphere.

More specifically; the magnesium compound, the titanium halide compound, the first electron donor compound (component (D1)), and the second electron donor compound (component (D2)) may be brought into contact with each other in an inert gas atmosphere in a state in which water and the like have been removed while stirring the components in a vessel equipped with a stiffer.

When merely bringing the components into contact with each other, and stirring (mixing) the mixture, or dispersing or suspending the components to effect modification, the components may be brought into contact with each other at a relatively low temperature around room temperature. When bringing the components into contact with each other, and reacting the mixture to obtain a product, it is preferable to bring the components into contact with each other at 40 to 130° C. In this case, it is preferable to react the mixture at the same temperature.

If the temperature is lower than 40° C., the reaction may not proceed sufficiently, and the resulting solid catalyst component may not exhibit sufficient performance. If the temperature exceeds 130° C., it may be difficult to control the reaction due to significant vaporization of the solvent, for example.

The reaction time is preferably 1 minute or more, more preferably 10 minutes or more, and still more preferably 30 minutes or more.

The ratio of each component used to produce the solid catalyst component for olefin polymerization differs depending on the production method, and may be appropriately determined.

For example, the titanium halide compound is preferably used in an amount of 0.5 to 100 mol, more preferably 0.5 to 10 mol, and still more preferably 1 to 5 mol, based on 1 mol of the magnesium compound.

The electron donor compound (that does not include a phthalic acid ester structure, and includes a diol skeleton) is preferably used in an amount of 0.01 to 10 mol, more preferably 0.01 to 1 mol, and still more preferably 0.02 to 0.6 mol, based on 1 mol of the magnesium compound.

The inert organic solvent (e.g., aromatic hydrocarbon compound) is preferably used in an amount of 0.001 to 500 mol, more preferably 0.001 to 70 mol, and still more preferably 0.005 to 50 mol, based on 1 mol of the magnesium compound.

The method for producing an olefin polymerization catalyst according to one embodiment of the invention brings the solid catalyst component for olefin polymerization, the vinylsilane compound, the organosilicon compound (that does not include a vinyl group, and includes at least one group selected from an alkoxy group and an amino group), and the organoaluminum compound into contact with each other.

Examples of the vinylsilane compound that is used in connection with the method for producing an olefin polymerization catalyst according to one embodiment of the invention, include a compound represented by the following general formula (II), and the like.

$(CH_2=CH-)SiR^2R^3R^4$ (II)

wherein $R^2$, $R^3$, and $R^4$ are independently a halogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are either identical to or different from each other.

$R^2$, $R^3$, and $R^4$ in the compound represented by the general formula (II) are independently a hydrogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms.

When $R^2$, $R^3$, and $R^4$ in the compound represented by the general formula (II) are a group derived from a saturated hydrocarbon compound having 1 to 10 carbon atoms, $R^2$, $R^3$, and $R^4$ are preferably a group derived from a saturated hydrocarbon compound having 1 to 5 carbon atoms, and more preferably a group derived from a saturated hydrocarbon compound having 1 to 2 carbon atoms.

When $R^2$, $R^3$, and $R^4$ in the compound represented by the general formula (II) are a group derived from a halogen-containing saturated hydrocarbon compound having 1 to 10 carbon atoms, $R^2$, $R^3$, and $R^4$ are preferably a group derived from a halogen-containing saturated hydrocarbon compound having 1 to 5 carbon atoms, and more preferably a group derived from a halogen-containing saturated hydrocarbon compound having 1 to 2 carbon atoms.

When $R^2$, $R^3$, and $R^4$ in the compound represented by the general formula (II) are a group derived from an aromatic hydrocarbon compound having 6 to 20 carbon atoms, $R^2$, $R^3$, and $R^4$ are preferably a group derived from an aromatic hydrocarbon compound having 6 to 10 carbon atoms, and more preferably a group derived from an aromatic hydrocarbon compound having 6 to 7 carbon atoms.

When $R^2$, $R^3$, and $R^4$ in the compound represented by the general formula (II) are a group derived from a halogen-containing aromatic hydrocarbon compound having 6 to 20 carbon atoms, $R^2$, $R^3$, and $R^4$ are preferably a group derived from a halogen-containing aromatic hydrocarbon compound having 6 to 10 carbon atoms, and more preferably a group derived from a halogen-containing aromatic hydrocarbon compound having 6 to 7 carbon atoms.

$R^2$, $R^3$, and $R^4$ in the compound represented by the general formula (II) are either identical to or different from each other.

The vinylsilane compound may be one or more compounds selected from vinylsilane, vinylmethylsilane, vinyldimethylsilane, vinyltrimethylsilane, vinyltrichlorosilane, vinylmethylchlorosilane, vinyldiethylchlorosilane, vinyltriethylsilane, vinyldiethylmethylsilane, vinyldimethylphenylsilane, vinylbenzyldimethylsilane, vinyldimethylchlorosilane, and the like.

Among these, vinylsilane, vinyltrimethylsilane, vinyltriethylsilane, divinyldimethylsilane, divinyldichlorosilane, divinyldiethylsilane, trivinylmethylsilane, and vinyltrichlorosilane are preferable, and vinylsilane, vinyltrimethylsilane, vinyltriethylsilane, and vinyltrichlorosilane are particularly preferable.

When implementing the method for producing an olefin polymerization catalyst according to one embodiment of the invention, the vinylsilane compound is preferably used in a 0.1 to 40-fold molar quantity, more preferably 0.5 to 20-fold molar quantity, and still more preferably 1 to 15-fold molar quantity, with respect to the molar quantity (on a titanium atom basis) of the titanium halide compound included in the solid catalyst component for olefin polymerization.

When the vinylsilane compound is used in a molar quantity within the above range, it is possible to produce a polymer having high stereoregularity while achieving high activity by polymerizing a monomer using the resulting polymerization catalyst in the same manner as in the case where a phthalic acid ester is used as the electron donor compound, although the solid catalyst component for olefin polymerization includes an electron donor compound other than a phthalic acid ester.

Since the method for producing an olefin polymerization catalyst according to one embodiment of the invention brings the solid catalyst component for olefin polymerization, the organosilicon compound (that does not include a vinyl group, and includes at least one group selected from an alkoxy group and an amino group), and the organoaluminum compound into contact with each other in the presence of the vinylsilane compound, it is possible to promote the formation of active sites on the surface or the inside of the solid catalyst component for olefin polymerization, effectively improve the polymerization activity due to an electronic effect with respect to the vinyl group of the vinylsilane compound and the Ti active sites. Moreover, the vinyl group of the vinylsilane compound protects the Ti active sites of the solid catalyst component, and suppresses a situation in which the organoaluminum reacts with the Ti active sites to a large extent, so that aggregation of the polymer particles rarely occurs. This makes it possible to effectively reduce production of a fine polymer powder that may occur when the aggregates of the polymer particles break, and effectively reduce adhesion of the polymer powder to a polymerization reactor, while ensuring that the resulting polymer exhibits high stereoregularity and high bulk density.

The organosilicon compound (that does not include a vinyl group, and includes at least one group selected from an alkoxy group and an amino group) that is used in connection with the method for producing an olefin polymerization catalyst according to one embodiment of the invention, is not particularly limited.

Examples of the organosilicon compound (that does not include a vinyl group, and includes at least one group selected from an alkoxy group and an amino group) include a compound represented by the following general formula (III).

wherein r is an integer from 0 to 2, s is an integer from 1 to 2, provided that r+s is an integer from 0 to 4, $R^5$, $R^6$, and $R^7$ are a hydrogen atom, or a group selected from a linear or branched alkyl group having 1 to 12 carbon atoms, a substituted or unsubstituted cycloalkyl group, a phenyl group, an allyl group, and an aralkyl group, and optionally include a hetero atom, provided that $R^6$ and $R^7$ are optionally bonded to each other to form a ring, and $R^5$, $R^6$, and $R^7$ are either identical to or different from each other, and $R^8$ is a group selected from an alkyl group having 1 to 4 carbon atoms, a cycloalkyl group, a phenyl group, a vinyl group, an allyl group, and an aralkyl group, and optionally includes a hetero atom.

$R^5$ in the compound represented by the general formula (III) is a hydrogen atom, or a group selected from a linear or branched alkyl group having 1 to 12 carbon atoms, a substituted or unsubstituted cycloalkyl group, a phenyl group, an allyl group, and an aralkyl group, and optionally includes a hetero atom.

$R^5$ is preferably a linear or branched alkyl group having 1 to 10 carbon atoms, or a cycloalkyl group having 5 to 8 carbon atoms, and particularly preferably a linear or branched alkyl group having 1 to 8 carbon atoms, or a cycloalkyl group having 5 to 8 carbon atoms.

$R^6$ and $R^7$ in the compound represented by the general formula (III) are a hydrogen atom, or a group selected from a linear or branched alkyl group having 1 to 12 carbon atoms, a substituted or unsubstituted cycloalkyl group, a phenyl group, an allyl group, and an aralkyl group, and optionally include a hetero atom.

$R^6$ and $R^7$ are preferably represent a linear or branched alkyl group having 1 to 10 carbon atoms, or a cycloalkyl group having 5 to 8 carbon atoms, and particularly preferably a linear or branched alkyl group having 1 to 8 carbon atoms, or a cycloalkyl group having 5 to 8 carbon atoms.

$R^6$ and $R^7$ are optionally bonded to each other to form a ring. In this case, $(NR^6R^7)$ that forms a ring is preferably a perhydroquinolino group or a perhydroisoquinolino group.

R⁵, R⁶, and R⁷ in the compound represented by the general formula (III) are either identical to or different from each other.

R⁸ in the compound represented by the general formula (III) is a group selected from an alkyl group having 1 to 4 carbon atoms, a cycloalkyl group, a phenyl group, an allyl group, and an aralkyl group, and optionally includes a hetero atom.

R⁸ is preferably an alkyl group having 1 to 4 carbon atoms.

The organosilicon compound may be one or more compounds selected from a phenylalkoxysilane, an alkylalkoxysilane, a phenylalkylalkoxysilane, a cycloalkylalkoxysilane, a cycloalkylalkylalkoxysilane, an (alkylamino)alkoxysilane, an alkyl(alkylamino)alkoxysilane, an alkykalkylamino)silane, are alkylaminosilane, and the like.

The organosilicon compound represented by the general formula (III) in which s is 0 is preferably one or more compounds selected from di-n-propyldimethoxysilane, diisopropyldimethoxysilane, di-n-butyldimethoxysilane, diisobutyldimethoxysilane, di-t-butyldimethoxysilane, t-butyltnethyldimethoxysilane, t-butylethyldimethoxysilane, di-n-butyldiethoxysilane, t-butyltrimethoxysilane, t-butyltriethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, 3,5-dimethylcyclohexylcyclopentyldimethoxysilane, and the like.

The organosilicon compound represented by the general formula (III) in which s is 0 is preferably one or more compounds selected from a di(alkylamino)dialkoxysilane, an (alkylamino)(cycloalkylamino)dialkoxysilane, an (alkylamino)(alkyl)dialkoxysilane, a di(cycloalkylamino)dialkoxysilane, a vinyl(alkylamino)dialkoxysilane, an allyl(alkylamino)dialkoxysilane, an (alkoxyamino)trialkoxysilane, an (alkylamino)trialkoxysilane, a (cycloalkylamino)trialkoxysilane, and the like. Among these, ethyl(t-butylamino)dimethoxysilane, cyclohexyl(cyclohexylamino)dimethoxysilane, ethyl(t-butylamino)dimethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, diethylaminotrimethoxysilane, diethylatninotriethoxysilane, and the like are more preferable, and bis(perhydroisoquinolino)dimethoxysilane, diethylaniinotrimethoxysilane, and diethylaminotriethoxysilane are particularly preferable.

These organosilicon compounds may be used in combination.

The organosilicon compound (that does not include a vinyl group, and includes at least one group selected from an alkoxy group and an amino group) that is used in connection with the method for producing an olefin polymerization catalyst according to one embodiment of the invention, is preferably used (added) in an amount of 0.002 to 10 mol, more preferably 0.01 to 2 mol, and still more preferably 0.1 to 5 mol, based on 1 mol of the organoaluminum compound (described later).

The organoaluminum compound that is used in connection with the method for producing an olefin polymerization catalyst according to one embodiment of the invention, is not particularly limited. Examples of the organoaluminum compound include a compound represented by the following general formula (IV).

$$R^9{}_pAlQ_{3-t} \qquad (IV)$$

wherein R⁹ is a hydrocarbyl group having 1 to 6 carbon atoms, provided that a plurality of R⁹ are either identical to or different from each other when a plurality of R⁹ are present, Q is a hydrogen atom, a hydrocarbyloxy group having 1 to 6 carbon atoms, or a halogen atom, provided that a plurality of Q are either identical to or different from each other when a plurality of Q are present, and t is a real number that is larger than 0 and equal to or less than 3 (0<p≤53).

R⁹ in the compound represented by the general formula (IV) is preferably an ethyl group or an isobutyl group, Q is preferably a hydrogen atom, a chlorine atom, or a bromine atom, and t is preferably 2 or 3, and particularly preferably 3.

Specific examples of such an organoaluminum compound (B) include triethylaluminum, diethylaluminum chloride, triisobutylaluminum, diethylaluminum bromide, and diethylaluminum hydride. These compounds may be used either alone or in combination. Among these, triethylaluminum and triisobutylaluminum are preferable.

The organoaluminum compound that is used in connection with the method for producing an olefin polymerization catalyst according to one embodiment of the invention, is preferably used in an amount of 1 to 2,000 mol, and more preferably 50 to 1,000 mol, based on 1 mol of titanium atoms included in the solid catalyst component for olefin polymerization.

The method for producing an olefin polymerization catalyst according to one embodiment of the invention includes bringing the solid catalyst component for olefin polymerization, the vinylsilane compound, the organosilicon compound (that does not include a vinyl group, and includes at least one group selected from an alkoxy group and an amino group), and the organoaluminum compound into contact with each other in the inert organic solvent under an inert gas atmosphere in the absence of a compound represented by the general formula (I): CH₂=CH—R¹ (wherein R¹ is a hydrogen atom or a hydrocarbon residue having 1 to 20 carbon atoms).

The inert gas (atmospheric gas) that is used in connection with the method for producing an olefin polymerization catalyst according to one embodiment of the invention, may be one or more inert gases selected from nitrogen, helium, neon, argon, methane, ethane, propane, and the like. The inert gas is preferably nitrogen or argon.

The inert organic solvent that is used in connection with the method for producing an olefin polymerization catalyst according to one embodiment of the invention, is used as a medium for reacting each component. The inert organic solvent may be one or more compounds selected from a saturated chain-like hydrocarbon and an alicyclic hydrocarbon.

The inert organic solvent may be one or more compounds selected from a saturated hydrocarbon compound such as pentane, hexane, heptane, octane, nonane, decant, cyclohexane, methylcyclohexane, ethylcyclohexane, 1,2-diethylcyclohexane, methylcyclohexene, decalin, and mineral oil, an aromatic hydrocarbon compound such as benzene, toluene, xylene, and ethylbenzene, a halogenated hydrocarbon compound such as o-dichlorobenzene, methylene chloride, 1,2-dichlorobenzene, carbon tetrachloride, and dichloroethane, and the like.

The inert organic solvent is preferably an aromatic hydrocarbon compound that has a boiling point of about 50 to 200° C. and is liquid at room temperature. More specifically, the inert organic solvent is preferably one or more compounds selected from hexane, heptane, octane, ethylcyclohexane, toluene, xylene, and ethylbenzene.

The compound represented by the following general formula (I) may be one or more compounds selected from ethylene, propylene, 1-butene, 1-pentene, 4-methyl-1-pentene, vinylcyclohexane, styrene, and the like.

wherein $R^1$ is a hydrogen atom or a hydrocarbon residue having 1 to 20 carbon atoms.

The method for producing an olefin polymerization catalyst according to one embodiment of the invention includes bringing the solid catalyst component for olefin polymerization, the vinylsilane compound, the organosilicon compound (that does not include a vinyl group, and includes at least one group selected from an alkoxy group and an amino group), and the organoaluminum compound into contact with each other in the inert organic solvent under an inert gas atmosphere in the absence of a compound represented by the general formula (I): $CH_2=CH-R^1$ (wherein $R^1$ is a hydrogen atom or a hydrocarbon residue having 1 to 20 carbon atoms).

When implementing the method for producing an olefin polymerization catalyst according to one embodiment of the invention, the components may be brought into contact with each other in an arbitrary order. It is preferable to sequentially add the organoaluminum compound, the organosilicon compound (that does not include a vinyl group, and includes at least one group selected from an alkoxy group and an amino group), and the vinylsilane compound to the reaction system, and bring the solid catalyst component for olefin polymerization into contact with the mixture.

The components may be brought into contact with each other at an arbitrary concentration and an arbitrary temperature for an arbitrary time, for example.

When implementing the method for producing an olefin polymerization catalyst according to one embodiment of the invention, it is preferable to bring the solid catalyst component for olefin polymerization, the vinylsilane compound, the organosilicon compound, and the organoaluminum compound into contact with each other in the inert organic solvent at a catalyst concentration of 0.01 g/L or more, more preferably 0.1 to 500 g/L, and still more preferably 1 to 300 g/L.

Note that the term "catalyst concentration" used herein refers to the weight (g) of the solid catalyst component for olefin polymerization included in 1 L of the inert organic solvent.

When implementing the method for producing an olefin polymerization catalyst according to one embodiment of the invention, it is preferable to bring the solid catalyst component for olefin polymerization, the vinylsilane compound, the organosilicon compound, and the organoaluminum compound into contact with each other in the inert organic solvent at a temperature of 50° C. or less, more preferably −10 to 40° C., and still more preferably 0 to 35° C.

When implementing the method for producing an olefin polymerization catalyst according to one embodiment of the invention, it is preferable to bring the solid catalyst component for olefin polymerization, the vinylsilane compound, the organosilicon compound, and the organoaluminum compound into contact with each other in the inert organic solvent for 1 minute or more, more preferably 1 to 120 minutes, and still more preferably 1 to 60 minutes.

When implementing the method for producing an olefin polymerization catalyst according to one embodiment of the invention in which the solid catalyst component for olefin polymerization, the vinylsilane compound, the organosilicon compound, and the organoaluminum compound are brought into contact with each other in the inert organic solvent, a washing treatment is not performed after the vinylsilane compound has been added to the reaction system.

Since the method for producing an olefin polymerization catalyst according to one aspect of the invention does not perform a washing treatment after the vinylsilane compound has been added to the reaction system when the solid catalyst component for olefin polymerization, the vinylsilane compound, the organosilicon compound, and the organoaluminum compound are brought into contact with each other in the inert organic solvent to effect a reaction, it is possible to suppress removal (elution) of the vinylsilane compound (soluble component). Since it is unnecessary to perform drying under reduced pressure (that is normally performed after a washing treatment), it is possible to suppress a situation in which the vinylsilane compound volatilizes and disappears, and effectively improve the polymerization activity. Moreover, it is possible to suppress aggregation of the polymer particles, effectively reduce production of a fine polymer powder that may occur when the aggregates of the polymer particles break, and effectively reduce adhesion of the polymer powder to a polymerization reactor, while ensuring that the resulting polymer exhibits high stereoregularity and high bulk density.

The embodiments of the invention thus provide a method for producing an olefin polymerization catalyst that can produce an olefin polymerization catalyst that exhibits excellent catalytic activity during polymerization, and can produce an olefin polymer that exhibits excellent stereoregularity and excellent bulk density, and has a particle size distribution in which the fine powder content and the coarse powder content are reduced, even when an electron donor compound other than a phthalic acid ester is used.

A method for producing an olefin polymer according to the embodiments of the invention is described below.

The method for producing an olefin polymer according to one embodiment of the invention includes bringing an olefin polymerization catalyst produced using the method for producing an olefin polymerization catalyst according to the embodiments of the invention into contact with one or more compounds selected from compounds represented by the following general formula (I).

wherein $R^1$ is a hydrogen atom or a hydrocarbon residue having 1 to 20 carbon atoms.

When implementing the method for producing an olefin polymer according to one embodiment of the invention, the olefin may be polymerized by homopolymerization or copolymerization (random copolymerization or block copolymerization).

The method for producing an olefin polymer according to one embodiment of the invention polymerizes one or more compounds (olefins) selected from a compound represented by the following general formula (I).

wherein $R^1$ is a hydrogen atom or a hydrocarbon residue having 1 to 20 carbon atoms.

The olefin represented by the general formula (I) may be one or more olefins selected from ethylene, propylene, 1-butene, 1-pentene, 4-methyl-1-pentene, vinylcyclohexane, styrene, and the like. Among these, propylene is particularly preferable.

The method for producing an olefin polymer according to one embodiment of the invention may copolymerize olefins. When propylene is copolymerized with another olefin, the olefin that is copolymerized with propylene may be one or more olefins selected from ethylene, propylene, 1-butene, 1-pentene, 4-methyl-1-pentene, vinylcyclohexane, styrene, and the like. Among these, ethylene and 1-butene are preferable.

When propylene is copolymerized with another olefin using the method for producing an olefin polymer according to one embodiment of the invention, propylene may be copolymerized by random copolymerization that polymerizes propylene and a small amount of ethylene, or may be copolymerized by propylene-ethylene block copolymerization that polymerizes propylene in a first stage (first polymerization tank), and copolymerizes propylene and ethylene in a second stage (second polymerization tank) or a multi-stage (multi-stage polymerization tank).

When implementing the method for producing an olefin polymer according to one embodiment of the invention, an alcohol may be added to the polymerization system in order to prevent formation of a gel in the final product when shifting from homopolymerization of propylene to block copolymerization.

The alcohol may be one or more alcohols selected from ethyl alcohol, isopropyl alcohol, and the like. The alcohol is preferably used in an amount of 0.01 to 10 mol, and more preferably 0.1 to 2 mol, based on 1 mol of titanium atoms included in the solid catalyst component for olefin polymerization.

When implementing the method for producing an olefin polymer according to one embodiment of the invention, the solid catalyst component for olefin polymerization, the vinylsilane compound, the organosilicon compound (that does not include a vinyl group, and includes at least one group selected from an alkoxy group and an amino group), and the organoaluminum compound are brought into contact with each other in the inert organic solvent in the absence of the compound represented by the general formula (I) to produce an olefin polymerization catalyst without performing a washing treatment after the vinylsilane compound has been added to the reaction system, and the olefin polymerization catalyst is brought into contact with one or more compounds selected from the compounds represented by the general formula (I) to produce an olefin polymer.

When implementing the method for producing an olefin polymer according to one embodiment of the invention, the olefin may be polymerized in the presence or absence of an inert organic solvent. When the olefin is polymerized in the presence of an inert organic solvent, an olefin polymer can be produced after producing the olefin polymerization catalyst according to one embodiment of the invention without isolating the olefin polymerization catalyst. Therefore, it is preferable to polymerize the olefin in the presence of an inert organic solvent.

Examples of the inert organic solvent include those mentioned above in connection with the production of the olefin polymerization catalyst according to one embodiment of the invention.

When implementing the method for producing an olefin polymer according to one embodiment of the invention, the olefin (e.g., propylene) may be polymerized in a gaseous state or a liquid state.

When implementing the method for producing an olefin polymer according to one embodiment of the invention, the olefin is preferably polymerized at a temperature from room temperature to 200° C., and more preferably polymerized at a temperature from room temperature to 100° C.

When implementing the method for producing an olefin polymer according to one embodiment of the invention, the polymerization pressure when polymerizing the olefin is preferably 10 MPa or less, and more preferably 6 MPa or less.

When implementing the method for producing an olefin polymer according to one embodiment of the invention, the olefin may be polymerized using a continuous polymerization method, or may be polymerized using a batch polymerization method. The polymerization reaction may be effected in a single stage, or may be effected in two or more stages.

The method for producing an olefin polymer according to one embodiment of the invention uses an olefin polymerization catalyst produced using the method for producing an olefin polymerization catalyst according to one embodiment of the invention. Since the olefin polymerization catalyst includes the organosilicon compound and the vinylsilane compound, it is possible to effectively improve the polymerization activity due to an electronic effect with respect to the vinyl group of the vinylsilane compound and the Ti active sites, although the solid catalyst component for olefin polymerization includes an electron donor compound other than a phthalic acid ester. Moreover, the vinyl group of the vinylsilane compound protects the Ti active sites of the solid catalyst component, and suppresses a situation in which the organoaluminum reacts with the Ti active sites to a large extent, so that aggregation of the polymer particles rarely occurs. This makes it possible to effectively reduce production of a fine polymer powder that may occur when the aggregates of the polymer particles break, and effectively reduce adhesion of the polymer powder to a polymerization reactor, while ensuring that the resulting polymer exhibits high stereoregularity and high bulk density.

The embodiments of the invention thus provide a method that can easily and inexpensively produce an olefin polymer that exhibits excellent stereoregularity and excellent bulk density, and has a particle size distribution in which the fine powder content and the coarse powder content are reduced, while ensuring excellent catalytic activity during polymerization, even when an electron donor compound other than a phthalic acid ester is used.

EXAMPLES

The invention is further described below by way of examples and comparative examples. Note that the invention is not limited to the following examples.

In the examples and the comparative examples, the titanium content in the catalyst or the solid catalyst component refers to a value measured in accordance with the method (oxidation-reduction titration) specified in JIS 8311-1997 ("Method for determination of titanium in titanium ores").

Example 1

Production of Solid Catalyst Component

A 500 ml round-bottom flask equipped with a stirrer in which the internal atmosphere had been sufficiently replaced by nitrogen gas, was charged with 20 g of diethoxymagnesium and 60 ml of toluene to prepare a suspension. Another 500 ml round-bottom flask equipped with a stirrer in which the internal atmosphere had been sufficiently replaced by nitrogen gas, was charged with 50 ml of toluene and 40 nil of titanium tetrachloride to prepare a solution, and the suspension prepared as described above was added to the solution. After reacting the resulting suspension at −6° C. for 1 hour, 3.6 ml of di-n-propyl 1-cyclohexene-1,2-dicarboxylate, and 0.9 ml of 2-isopropyl-2-isopentyl-1,3-dimethoxypropane were added. After heating the mixture to 100° C., the mixture was reacted for 2 hours with stirring. After completion of the reaction, the supernatant liquid was removed. After the addition of 40 ml of titanium tetrachloride, the mixture was reacted at 100° C. for 2 hours. The resulting reaction product was washed four times with 150 ml of toluene at 100° C., and washed six times with 150 ml of n-heptane at 40° C. to obtain a solid catalyst component (A1).

After performing a solid-liquid separation operation, the titanium content in the solid catalyst component (A1) was measured, and found to be 2.4 mass %.

Production of Polymerization Catalyst and Polymerization

An autoclave (internal volume: 2.0 l) equipped with a stirrer in which the internal atmosphere had been completely replaced by nitrogen gas, was charged with 7 ml of n-heptane, 1.32 mmol of triethylaluminum, 0.13 mmol of diisopropyldimethoxysilane (DIPDMS), 0.013 mmol of vinyltrimethylsilane, and 0.0026 mmol (on a titanium atom basis) of the solid catalyst component (A1), which were brought into contact with each other at 20° C. for 10 minutes in a nitrogen atmosphere to produce a polymerization catalyst (i.e., a washing treatment was not performed). The molar ratio (amount of vinyltrimethylsilane/amount of titanium atoms included in solid catalyst component) of the amount of vinyltrimethylsilane to the amount of titanium atoms included in the solid catalyst component was 5.

After the addition of 1.5 l of hydrogen gas and 1.4 l of liquefied propylene to the liquid including the polymerization catalyst produced as described above, preliminary polymerization was effected at 20° C. for 5 minutes. After heating the mixture, a polymerization reaction was effected at 75° C. for 1 hour. The polymerization activity per gram of the solid catalyst component, the bulk density (BD) of the polymer, the melt flow rate (MFR) of the polymer, the p-xylene-soluble content (XS) in the polymer, the particle size distribution of the polymer, the fine powder (75 μm or less) content in the polymer, and the coarse powder (1,180 μm or more) content in the polymer, were measured as described below. The results are listed in Table 1.

Polymerization Activity Per Gram of Solid Catalyst Component

The polymerization activity per gram of the solid catalyst component was calculated using the following expression.

Polymerization activity (g-pp/g-catalyst)=mass (g) of polymer/mass (g) of solid catalyst component Bulk Density (BD) of Polymer The bulk density (BD) of the polymer was measured in accordance with JIS K 6721.

Melt Flow Rate (MFR) of Polymer

The melt flow rate (MFR) (melt flow index) of the polymer was measured in accordance with ASTM D238 (JIS K 7210).

Xylene-Soluble Content (XS) in Polymer

A flask equipped with a stirrer was charged with 4.0 g of the polymer (polypropylene) and 200 ml of p-xylene. The external temperature was increased to be equal to or higher than the boiling point (about 150° C.) of xylene, and the polymer was dissolved over 2 hours in a state in which p-xylene contained in the flask was maintained at a temperature (137 to 138° C.) lower than the boiling point. The solution was cooled to 23° C. over 1 hour, and an insoluble component and a soluble component were separated by filtration. A solution including the soluble component was collected, and p-xylene was evaporated by heating and drying under reduced pressure. The mass of the residue (xylene-soluble component) was calculated as a value (mass %) relative to the mass of the polymer (polypropylene), and taken as the xylene-soluble content (XS).

Particle Size Distribution, Average Particle Size (D50), Fine Powder (75 μm or less) Content, and Coarse Powder (1,180 μm or more) Content with Respect to Polymer The cumulative volume particle size distribution of the polymer was automatically measured under the following measurement conditions using a digital particle size distribution analyzer ("CAMSIZER" manufactured by Horiba Ltd.) to determine the fine powder (75 μm or less) content (wt %), the coarse powder (1,180 μm or more) content (wt %), and the average particle size (D50) at 50% in the cumulative volume particle size distribution.

Measurement Conditions

Funnel position: 6 mm

Cover area of camera: basic camera: less than 3%, zoom camera: less than 10%

Target cover area: 0.5%

Width of feeder: 40 mm

Feeder control level: 57 and 40 seconds

Measurement start level: 47

Maximum control level: 80

Control standard: 20

Image rate: 50% (1:2)

Definition of particle size: minimum Martin's diameter when the diameter of each particle was measured n times SPHT (sphericity) fitting: 1

Class upper limit: 50 points were selected within a range from 32 μm to 4,000 μm (logarithmic scale)

Comparative Example 1

Production of Solid Catalyst Component

A solid catalyst component (A2) was produced in the same manner as in Example 1, except that 7 ml (in total) of di-n-propyl 1-cyclohexene-1,2-dicarboxylate was used instead of 0.9 ml of 2-isopropyl-2-isopentyl-1,3-dimethoxypropane. The titanium content in the resulting solid catalyst component (A2) was 2.9 mass %.

Production of Polymerization Catalyst and Polymerization

A polymerization catalyst was produced, and polymerization was effected in the same manner as in Example 1, except that the solid catalyst component (A2) was used. The polymerization activity per gram of the solid catalyst component, the bulk density (BD) of the polymer, the melt flow rate (MFR) of the polymer, the p-xylene-soluble content (XS) in the polymer, the particle size distribution of the polymer, the fine powder (75 μm or less) content in the polymer, and the coarse powder (1,180 μm or more) content in the polymer, were measured in the same manner as in Example 1. The results are listed in Table 1.

Example 2

Production of Solid Catalyst Component

A solid catalyst component (A3) was produced in the same manner as in Example 1, except that 2-isopropyl-2-isopentyl-1,3-dimethoxypropane was used instead of 7 ml of di-n-propyl 1-cyclohexene-1,2-dicarboxylate in an equimolar amount. The titanium content in the solid catalyst component (A3) was 2.5 mass %.

Production of Polymerization Catalyst and Polymerization

A polymerization catalyst was produced, polymerization was effected, and the resulting polymer was evaluated in the same manner as in Example 1, except that the solid catalyst component (A3) was used. The results are listed in Table 1.

Comparative Example 2

A solid catalyst component was produced, a polymerization catalyst was produced, polymerization was effected, and the resulting polymer was evaluated in the same manner as in Example 2, except that vinyltrimethylsilane was not used. The results are listed in. Table 1.

Comparative Example 3

A solid catalyst component was produced, a polymerization catalyst was produced, polymerization was effected, and the resulting polymer was evaluated in the same manner as in Example 1, except that vinytrimethylsilane was not used. The results are listed in Table 1.

Comparative Example 4

Production of Solid Catalyst Component

A 500 ml round-bottom flask equipped with a stirrer in which the internal atmosphere had been sufficiently replaced by nitrogen gas, was charged with 20 g of diethoxymagnesium and 60 ml of toluene to prepare a suspension. Another 500 ml round-bottom flask equipped with a stirrer in which the internal atmosphere had been sufficiently replaced by nitrogen gas, was charged with 50 ml of toluene and 40 ml of titanium tetrachloride to prepare a solution, and the suspension prepared as described above was added to the solution to effect a reaction at 5° C. for 1 hour. After the addition of 3.6 ml of di-n-propyl 1-cyclohexene-1,2-dicarboxylate and 0.9 ml of 2-isopropyl-2-isopentyl-1,3-dimethoxypropane, the mixture was heated to 100° C., and reacted for 2 hours with stirring. After completion of the reaction, the supernatant liquid was removed, and the residue was washed (intermediate washing) four times with 150 ml of toluene at 80° C. After the addition of 80 ml of toluene and 5 ml of titanium tetrachloride, the mixture was reacted at 110° C. for 2 hours with stirring. After removing the supernatant liquid, 80 ml of toluene and 5 ml of titanium tetrachloride were added, and the mixture was reacted at 110° C. for 2 hours with stirring. After removing the supernatant liquid, the product was washed six times with 150 ml of heptane at 40° C., filtered, and dried to obtain a powdery solid catalyst component. The titanium content in the solid catalyst component was 2.2 wt %.

Production of Polymerization Catalyst and Polymerization 10 g of the solid catalyst component produced as described above was suspended in 100 ml of heptane to prepare a suspension. 23 mmol of vinyltrimethylsilane was added to the suspension, and the mixture was stirred at 30° C. for 1 hours.

The molar ratio (amount of vinyltrimethylsilane/amount of titanium atoms included in solid catalyst component) of the amount of vinyltrimethylsilane to the amount of titanium atoms included in the solid catalyst component was 5.

The product was washed twice with 100 ml of heptane at 40° C., filtered, and dried to obtain a powdery catalyst component (A4). The catalyst component was analyzed, and it was found that the titanium content was 2.1 wt %, the magnesium atom content was 18.6 wt %, and the chlorine atom content was 60.9 wt %.

A polymerization catalyst was produced, polymerization was effected, and the resulting polymer was evaluated in the same manner as in Example 1, except that the catalyst component (A4) was used, and vinytrimethylsilane was not used. The results are listed in Table 1.

Example 3

Production of Solid Catalyst Component

A solid catalyst component (A5) was produced in the same manner as in Example 1, except that 5-t-butyl-1,2-phenylenediethyl carbonate was used instead of 3.6 ml of di-n-propyl 1-cyclohexene-1,2-dicarboxylate in an equimolar amount. The titanium content in the resulting solid catalyst component (A5) was 2.6 mass %.

Production of Polymerization Catalyst and Polymerization

A polymerization catalyst was produced, polymerization was effected, and the resulting polymer was evaluated in the same manner as in Example 1, except that the solid catalyst component (A5) was used. The results are listed in Table 1.

Example 4

Production of Solid Catalyst Component

A solid catalyst component (A6) was produced in the same manner as in Comparative Example 1, except that 5-t-butyl-1,2-phenylenediethyl carbonate was used instead of 7 ml of di-n-propyl 1-cyclohexene-1,2-dicarboxylate in an equimolar amount. The titanium content in the solid catalyst component (A6) was 2.8 mass %.

Production of Polymerization Catalyst and Polymerization

A polymerization catalyst was produced, polymerization was effected, and the resulting polymer was evaluated in the same manner as in Example 1, except that the solid catalyst component (A6) was used. The results are listed in Table 1.

Example 5

Production of Solid Catalyst Component

A solid catalyst component (A7) was produced in the same manner as in Example 1, except that ethyl 3-ethoxy-2-t-butylpropionate was used instead of di-n-propyl 1-cyclohexene-1,2-dicarboxylate in an equimolar amount. The titanium content in the solid catalyst component (A7) was 1.9 mass %.

Production of Polymerization Catalyst and Polymerization

A polymerization catalyst was produced, polymerization was effected, and the resulting polymer was evaluated in the same manner as in Example 1, except that the solid catalyst component (A7) was used. The results are listed in Table 1.

Comparative Example 5

Production of Solid Catalyst Component

A solid catalyst component (A8) was produced in the same manner as in Comparative Example 1, except that ethyl 3-ethoxy-2-t-butylpropionate was used instead of di-n-propyl 1-cyclohexene-1,2-dicarboxylate in an equimolar amount. The titanium content in the solid catalyst component (A8) was 2.7 mass %.

Production of Polymerization Catalyst and Polymerization

A polymerization catalyst was produced, polymerization was effected, and the resulting polymer was evaluated in the same manner as in Example 1, except that the catalyst component (A8) was used, and vinyltrimethylsilane was not used. The results are listed in Table 1.

Example 6

Production of Solid Catalyst Component

A solid catalyst component (A9) was produced in the same manner as in Example 1, except that diethyl 2,3-diisopropylsuccinate was used instead of 3.6 ml of di-n-propyl 1-cyclohexene-1,2-dicarboxylate in an equimolar amount. The titanium content in the solid catalyst component (A9) was 3.1 mass %.

Production of Polymerization Catalyst and Polymerization

A polymerization catalyst was produced, polymerization was effected, and the resulting polymer was evaluated in the same manner as in Example 1, except that the solid catalyst component (A9) was used. The results are listed in Table 1.

Comparative Example 6

Production of Solid Catalyst Component

A solid catalyst component (A10) was produced in the same manner as in Comparative Example 1, except that diethyl 2,3-diisopropylsuccinate was used instead of 7 ml of di-n-propyl 1-cyclohexene-1,2-dicarboxylate in an equimolar amount. The titanium content in the solid catalyst component (A10) was 3.2 mass %.

Production of Polymerization Catalyst and Polymerization

A polymerization catalyst was produced, polymerization was effected, and the resulting polymer was evaluated in the same manner as in Example 1, except that the catalyst component (A10) was used, and vinyltrimethylsilane was not used. The results are listed in Table 1.

Example 7

Production of Solid Catalyst Component

A solid catalyst component (A11) was produced in the same manner as in Example 1, except that 2-benzyloxyethyl phenyl carbonate was used instead of 3.6 ml of di-n-propyl 1-cyclohexene-1,2-dicarboxylate in an equimolar amount. The titanium content in the solid catalyst component (A11) was 3.0 mass %.

Production of Polymerization Catalyst and Polymerization

A polymerization catalyst was produced, polymerization was effected, and the resulting polymer was evaluated in the same manner as in Example 1, except that the solid catalyst component (A11) was used. The results are listed in Table 1.

Example 8

A polymerization catalyst was produced, polymerization was effected, and the resulting polymer was evaluated in the same manner as in Example 7, except that the amount of vinyltrimethylsilane was changed so that the molar ratio (amount of vinyltrimethylsilane/amount of titanium atoms included in solid catalyst component) of the amount of vinyltrimethylsilane to the amount of titanium atoms included in the solid catalyst component was 1. The results are listed in Table 1.

Example 9

A solid catalyst component was produced, a polymerization catalyst was produced, polymerization was effected, and the resulting polymer was evaluated in the same manner as in Example 7, except that the amount of vinyltrimethylsilane was changed so that the molar ratio (amount of vinyltrimethylsilane/amount of titanium atoms included in solid catalyst component) of the amount of vinyltrimethylsilane to the amount of titanium atoms included in the solid catalyst component was 2. The results are listed in Table 1.

Example 10

A solid catalyst component was produced, a polymerization catalyst was produced, polymerization was effected, and the resulting polymer was evaluated in the same manner as in Example 7, except that the amount of vinyltrimethylsilane was changed so that the molar ratio (amount of vinyltrimethylsilane/amount of titanium atoms included in solid catalyst component) of the amount of vinyltrimethylsilane to the amount of titanium atoms included in the solid catalyst component was 15. The results are listed in Table 1.

Example 11

Production of Solid Catalyst Component

A solid catalyst component (A12) was produced in the same manner as in Example 1 (see "Production of solid catalyst component").

Production of Polymerization Catalyst and Polymerization

A polymerization catalyst was produced, polymerization was effected, and the resulting polymer was evaluated in the same manner as in Example 1, except that the solid catalyst component (A12) was used instead of the solid catalyst component (A1), and 7 ml of a mineral oil ("Hydrobrite 380" manufactured by Shima Trading Co., Ltd.) was used instead of 7 ml of n-heptane. The results are listed in Table 1.

Comparative Example 7

Production of Solid Catalyst Component

A solid catalyst component (A13) was produced in the same manner as in Comparative Example 1, except that 2-benzyloxyethyl phenyl carbonate was used instead of 7 ml of di-n-propyl 1-cyclohexane-1,2-dicarboxylate in an equimolar amount. The titanium content in the solid catalyst component (A13) was 2.8 mass %.

Production of Polymerization Catalyst and Polymerization

A polymerization catalyst was produced, polymerization was effected, and the resulting polymer was evaluated in the same manner as in Example 1, except that the catalyst component (A13) was used, and vinyltrimethylsilane was not used. The results are listed in Table 1.

Example 12

Production of Solid Catalyst Component

A 500 ml round-bottom flask equipped with a stirrer in which the internal atmosphere had been sufficiently replaced by nitrogen gas, was charged with 20 g of diethoxymagnesium and 60 ml of toluene to prepare a suspension. Another 500 ml round-bottom flask equipped with a stirrer in which the internal atmosphere had been sufficiently replaced by nitrogen gas, was charged with 50 ml of toluene and 40 ml of titanium tetrachloride to prepare a solution, and the suspension prepared as described above was added to the solution. After reacting the resulting suspension at −6° C. for 1 hour, 2.3 ml of 2-ethoxyethyl 1-methyl carbonate and 0.9 ml of 2-isopropyl-2-isopentyl-1,3-dimethoxypropane were added. After heating the mixture to 100° C., the mixture was reacted for 2 hours with stirring. After completion of the reaction, the supernatant liquid was removed, and the residue was washed four times with 150 ml of toluene at 90° C. After the addition of 20 ml of titanium tetrachloride and 100 ml of toluene to the resulting reaction product, the mixture was heated to 100° C., and reacted for 15 minutes. This operation was performed four times. The resulting product was washed six times with 150 ml of n-heptane at 40° C. to obtain a solid catalyst component (A14).

After performing a solid-liquid separation operation, the titanium content in the solid catalyst component (A14) was measured, and found to be 2.7 mass %.

Production of Polymerization Catalyst and Polymerization

A polymerization catalyst was produced, polymerization was effected, and the resulting polymer was evaluated in the same manner as in Example 1, except that the solid catalyst component (A14) was used, and cyclohexylmethyldimethoxysilane was used instead of diisopropyldimethoxysilane in an equimolar amount. The results are listed in Table 2.

Example 13

A solid catalyst component was produced, a polymerization catalyst was produced, polymerization was effected, and the resulting polymer was evaluated in the same manner as in Example 12, except that the amount of vinyltrimethylsilane was changed so that the molar ratio (amount of vinyltrimethylsilane/amount of titanium atoms included in solid catalyst component) of the amount of vinyltrimethylsilane to the amount of titanium atoms included in the solid catalyst component was 10. The results are listed in Table 2.

Example 14

Production of Solid Catalyst Component

A solid catalyst component (A15) was produced in the same manner as in Example 12, except that 2-ethoxyethyl 1-ethyl carbonate was used instead of 2.3 ml of 2-ethoxyethyl 1-methyl carbonate in an equimolar amount. The titanium content in the solid catalyst component (A15) was 2.6 mass %.

Production of Polymerization Catalyst and Polymerization

A polymerization catalyst was produced, polymerization was effected, and the resulting polymer was evaluated in the same manner as in Example 12, except that the solid catalyst component (A15) was used. The results are listed in Table 2.

Example 15

Production of Solid Catalyst Component

A solid catalyst component (A16) was produced in the same manner as in Example 12, except that 9,9-bis-methoxymethylfluorene was used instead of 0.9 ml of 2-isopropyl-2-isopentyl-1,3-dimethoxypropane in an equimolar amount. The titanium content in the solid catalyst component (A15) was 2.4 mass %.

Production of Polymerization Catalyst and Polymerization

A polymerization catalyst was produced, polymerization was effected, and the resulting polymer was evaluated in the same manner as in Example 12, except that the solid catalyst component (A16) was used. The results are listed in Table 2.

Comparative Example 8

A solid catalyst component was produced, a polymerization catalyst was produced, polymerization was effected, and the resulting polymer was evaluated in the same manner as in Example 12, except that vinyltrimethylsilane was not used. The results are listed in Table 2.

Example 16

A solid catalyst component was produced, a polymerization catalyst was produced, polymerization was effected, and the resulting polymer was evaluated in the same manner as in Example 12, except that dichlorodivinylsilane was used instead of vinyltrimethylsilane in an equimolar amount. The results are listed in Table 2.

Example 17

A solid catalyst component was produced, a polymerization catalyst was produced, polymerization was effected, and the resulting polymer was evaluated in the same manner as in Example 12, except that methyltrivinylsilane was used instead of vinyltrimethylsilane in an equimolar amount. The results are listed in Table 2.

Example 18

Production of Solid Catalyst Component

A solid catalyst component (A17) was produced in the same manner as in Example 12, except that diethyl maleate was used instead of 2.3 ml of 2-ethoxyethyl 1-methyl carbonate in an equimolar amount. The titanium content in the solid catalyst component (A17) was 3.5 mass %.

Production of Polymerization Catalyst and Polymerization

A polymerization catalyst was produced, polymerization was effected, and the resulting polymer was evaluated in the same manner as in Example 12, except that the solid catalyst component (A17) was used. The results are listed in Table 2.

Example 19

Production of Solid Catalyst Component

A solid catalyst component (A18) was produced in the same manner as in Example 12, except that diethyl benzylidenemalonate was used instead of 2.3 ml of 2-ethoxyethyl 1-methyl carbonate in an equimolar amount. The titanium content in the solid catalyst component (A18) was 2.0 mass %.

Production of Polymerization Catalyst and Polymerization

A polymerization catalyst was produced, polymerization was effected, and the resulting polymer was evaluated in the same manner as in Example 12, except that the solid catalyst component (A18) was used. The results are listed in Table 2.

Example 20

Production of Catalyst Component

A solid catalyst component (A19) was produced in the same manner as in Example 12, except that diethyl 2,3-diisopropylsuccinate was used instead of 2.3 ml of 2-ethoxyethyl 1-methyl carbonate in an equimolar amount. The titanium content in the solid catalyst component (A19) was 3.0 mass %.

Production of Polymerization Catalyst and Polymerization

A polymerization catalyst was produced, polymerization was effected, and the resulting polymer was evaluated in the same manner as in Example 12, except that the solid catalyst component (A19) was used. The results are listed in Table 2.

Example 21

Production of Catalyst Component

A solid catalyst component (A20) was produced in the same manner as in Example 12, except that 2,4-pentanediol dibenzoate was used instead of 2.3 ml of 2-ethoxyethyl 1-methyl carbonate in an equimolar amount. The titanium content in the resulting solid catalyst component (A20) was 2.9 mass %.

Production of Polymerization Catalyst and Polymerization

A polymerization catalyst was produced, polymerization was effected, and the resulting polymer was evaluated in the same manner as in Example 12, except that the solid catalyst component (A20) was used. The results are listed in Table 2.

Example 22

Production of Solid Catalyst Component

A solid catalyst component (A21) was produced in the same manner as in Example 12 (see "Production of solid catalyst component").

Production of Polymerization Catalyst and Polymerization

A polymerization catalyst was produced, polymerization was effected, and the resulting polymer was evaluated in the same manner as in Example 12, except that 7 ml of a mineral oil ("Hydrobrite 380" manufactured by Shima Trading Co., Ltd.) was used instead of 7 ml of n-heptane. The results are listed in Table 2.

Example 23

Production of Solid Catalyst Component

A 500 ml round-bottom flask equipped with a stirrer in which the internal atmosphere had been sufficiently replaced by nitrogen gas, was charged with 20 g of diethoxymagnesium and 60 ml of toluene to prepare a suspension. Another 500 ml round-bottom flask equipped with a stirrer in which the internal atmosphere had been sufficiently replaced by nitrogen gas, was charged with 50 ml of toluene and 40 ml of titanium tetrachloride to prepare a solution, and the suspension prepared as described above was added to the solution. After reacting the resulting suspension at −6° C. for 1 hour, 2.3 ml of 2-ethoxyethyl 1-methyl carbonate and 0.9 ml of 2-isopropyl-2-isopentyl-1,3-dimethoxypropane were added. After heating the mixture to 100° C., the mixture was reacted for 2 hours with stirring. After completion of the reaction, the supernatant liquid was removed, and the residue was washed four times with 150 ml of toluene at 90° C. After the addition of 20 ml of titanium tetrachloride and 100 ml of toluene to the resulting reaction product, the mixture was heated to 100° C., and reacted for 15 minutes. This operation was performed four times. The resulting product was washed six times with 150 ml of n-heptane at 40° C. The reaction product was mixed into a mineral oil ("Hydrobrite 380" manufactured by Shima Trading Co., Ltd.) to obtain a solid catalyst component (A22) in the form of a slurry.

The titanium content in the solid catalyst component (A22) was 2.7 mass %.

Production of Polymerization Catalyst and Polymerization

An autoclave (internal volume: 2.01) equipped with a stirrer in which the internal atmosphere had been completely replaced by nitrogen gas, was charged with 7 ml of a mineral oil ("Hydrobrite 380" manufactured by Shima Trading Co., Ltd.), 1.32 mmol of triethylaluminum, and 0.13 mmol of cyclohexylmethyldimethoxysilane. 0.0026 mmol (on a titanium atom basis) of the solid catalyst component (A22) (slurry) to which 0.013 mmol of vinyltrimethylsilane was added, was brought into contact with the mixture at 20° C. for 10 hours in a nitrogen atmosphere to produce a polymerization catalyst (i.e., washing was not performed). The molar ratio (amount of vinyltrimethylsilane/amount of titanium atoms included in solid catalyst component) of the amount of vinyltrimethylsilane to the amount of titanium atoms included in the solid catalyst component was 5.

Polymerization was effected, and the resulting polymer was evaluated in the same manner as in Example 1. The results are listed in Table 2.

Comparative Example 9

A solid catalyst component was produced, a polymerization catalyst was produced, polymerization was effected, and the resulting polymer was evaluated in the same manner as in Example 12, except that diallyldimethylsilane was used instead of vinyltrimethylsilane in an equimolar amount. The results are listed in Table 2.

Comparative Example 10

A solid catalyst component was produced, a polymerization catalyst was produced, polymerization was effected, and the resulting polymer was evaluated in the same manner as in Example 20, except that vinyltrimethylsilane was not used. The results are listed in Table 2.

Comparative Example 11

A solid catalyst component was produced, a polymerization catalyst was produced, polymerization was effected, and the resulting polymer was evaluated in the same manner as in Example 21, except that vinyltrimethylsilane was not used. The results are listed in Table 2.

Example 24

Production of Solid Catalyst Component 75 g of anhydrous magnesium chloride, 375 ml of decane, and 300 g of 2-ethylhexyl alcohol were heated at 135° C. for 4 hours to obtain a homogeneous solution, and 16.7 ml of 2-ethoxyethyl 1-methyl carbonate was added to the solution. The homogeneous solution thus obtained was cooled to room temperature, and 113 ml of the homogeneous solution was added dropwise to 300 ml of titanium tetrachloride held at −20° C. over 45 minutes. After the dropwise addition, the mixture was heated to 110° C. over 4 hours, and 1.6 ml of 2-isopropyl-2-isopentyl-1,3-dimethoxypropane and 0.9 ml of 2-ethoxyethyl 1-methyl carbonate were added to the mixture. The mixture was stirred at 110° C. for 2 hours, and filtered, and the solid was washed with decane to obtain a solid catalyst component (A23). The titanium content in the solid catalyst component (A23) was 1.8 wt %.

Production of Polymerization Catalyst and Polymerization

A polymerization catalyst was produced, polymerization was effected, and the resulting polymer was evaluated in the same manner as in Example 12, except that the solid catalyst component (A23) was used. The results are listed in Table 3.

Comparative Example 12

A solid catalyst component was produced, a polymerization catalyst was produced, polymerization was effected, and the resulting polymer was evaluated in the same manner as in Example 24, except that vinyltrimethylsilane was not used when producing the polymerization catalyst. The results are listed in Table 3.

TABLE 1

|  | Vinylsilane compound/ Ti ratio (mol/mol) | Polymerization activity (g/g) | Bulk density of polymer (BD) (g/mL) | Melt flow rate (MFR) (g/10 min) | Xylene-soluble content (XS) (mass %) | Fine powder (≤75 μm) content (mass %) | Coarse powder (≥1,180 um) content (mass %) | Average particle size (D50) (μm) |
| --- | --- | --- | --- | --- | --- | --- | --- | --- |
| Example 1 | 5 | 52,400 | 0.43 | 8.3 | 1.2 | 0.3 | 0.1 | 590 |
| Comparative Example 1 | 5 | 31,200 | 0.41 | 11 | 1.5 | 1.1 | 0.5 | 520 |
| Example 2 | 5 | 34,900 | 0.40 | 16 | 0.8 | 0.9 | 0.0 | 510 |
| Comparative Example 2 | 0 | 27,900 | 0.39 | 18 | 1.0 | 2.1 | 0.5 | 500 |
| Comparative Example 3 | 0 | 28,200 | 0.42 | 7.9 | 1.3 | 2.0 | 0.9 | 500 |
| Comparative Example 4 | 5 | 30,400 | 0.42 | 9 | 1.4 | 1.7 | 0.8 | 510 |
| Example 3 | 5 | 46,500 | 0.40 | 5.3 | 1.9 | 0.5 | 0.0 | 530 |
| Example 4 | 5 | 35,300 | 0.40 | 5.1 | 2.6 | 1.0 | 0.0 | 520 |
| Example 5 | 5 | 59,400 | 0.44 | 12 | 0.8 | 0.2 | 0.1 | 610 |
| Comparative Example 5 | 0 | 31,500 | 0.43 | 15 | 2.6 | 1.9 | 1.0 | 490 |
| Example 6 | 5 | 45,800 | 0.41 | 6.9 | 1.3 | 0.6 | 0.0 | 550 |
| Comparative Example 6 | 0 | 28,800 | 0.40 | 5.1 | 1.5 | 2.6 | 0.9 | 500 |
| Example 7 | 5 | 63,600 | 0.42 | 14 | 1.1 | 0.6 | 0.1 | 610 |
| Example 8 | 1 | 46,400 | 0.42 | 14 | 1.1 | 0.5 | 0.0 | 580 |
| Example 9 | 2 | 52,000 | 0.42 | 13 | 1.0 | 0.3 | 0.0 | 560 |
| Example 10 | 15 | 54,600 | 0.42 | 17 | 1.0 | 0.6 | 0.1 | 570 |
| Example 11 | 5 | 49,200 | 0.43 | 8.0 | 1.2 | 0.3 | 0.1 | 560 |
| Comparative Exmple 7 | 0 | 25,400 | 0.41 | 4.1 | 1.2 | 3.1 | 0.9 | 470 |

TABLE 2

|  | Vinylsilane compound/ Ti ratio (mol/mol) | Polymerization activity (g/g) | Bulk density of polymer (BD) (g/mL) | Melt flow rate (MFR) (g/10 min) | Xylene-soluble content (XS) (mass %) | Fine powder (≤75 μm) content (mass %) | Coarse powder (≥1,180 um) content (mass %) | Average particle size (D50) (μm) |
| --- | --- | --- | --- | --- | --- | --- | --- | --- |
| Example 12 | 5 | 60,200 | 0.42 | 18 | 1.5 | 0.3 | 0.1 | 630 |
| Example 13 | 10 | 62,400 | 0.42 | 15 | 1.5 | 0.2 | 0.1 | 630 |
| Example 14 | 5 | 58,200 | 0.42 | 23 | 1.6 | 0.4 | 0.1 | 620 |
| Example 15 | 5 | 65,600 | 0.42 | 20 | 1.7 | 0.5 | 0.1 | 620 |
| Comparative Example 8 | 0 | 29,400 | 0.41 | 27 | 1.7 | 1.8 | 1.1 | 480 |
| Example 16 | 5 | 34,900 | 0.41 | 18 | 1.3 | 0.9 | 0.0 | 530 |
| Example 17 | 5 | 32,600 | 0.41 | 17 | 1.5 | 1.0 | 0.1 | 520 |
| Comparative Example 9 | 5 | 28,300 | 0.41 | 19 | 1.5 | 1.7 | 0.6 | 470 |
| Example 18 | 5 | 45,100 | 0.43 | 36 | 3.0 | 0.4 | 0.0 | 560 |
| Example 19 | 5 | 66,700 | 0.42 | 22 | 2.2 | 0.6 | 0.1 | 630 |
| Example 20 | 5 | 53,300 | 0.41 | 13 | 1.6 | 0.6 | 0.1 | 570 |
| Comparative Example 10 | 0 | 33,000 | 0.40 | 12 | 1.7 | 2.2 | 1.1 | 520 |
| Example 21 | 5 | 56,200 | 0.42 | 11 | 2.3 | 0.4 | 0.0 | 600 |
| Example 22 | 5 | 58,500 | 0.42 | 17 | 1.5 | 0.3 | 0.1 | 600 |
| Example 23 | 5 | 61,800 | 0.42 | 18 | 1.5 | 0.2 | 0.1 | 630 |
| Comparative Example 11 | 0 | 32,500 | 0.41 | 13 | 2.5 | 1.6 | 1.4 | 500 |

TABLE 3

|  | Vinylsilane compound/ Ti ratio (mol/mol) | Polymerization activity (g/g) | Bulk density of polymer (BD) (g/mL) | Melt flow rate (MFR) (g/10 min) | Xylene-soluble content (XS) (mass %) | Fine powder (≤75 μm) content (mass %) | Coarse powder (≥1,180 um) content (mass %) | Average particle size (D50) (μm) |
|---|---|---|---|---|---|---|---|---|
| Example 24 | 5 | 49,100 | 0.38 | 22 | 1.8 | 0.3 | 0.0 | 570 |
| Comparative Example 12 | 0 | 28,700 | 0.36 | 33 | 2.0 | 2.0 | 1.0 | 500 |

As is clear from the results listed in Tables 1 to 3, the olefin polymerization catalysts obtained in Examples 1 to 24 that were produced by bringing the solid catalyst component for olefin polymerization, the vinylsilane compound, the organosilicon compound, and the organoaluminum compound into contact with each other in an inert organic solvent in the absence of an olefin, wherein a washing treatment was not performed after the vinylsilane compound had been added to the reaction system, the solid catalyst component including a magnesium compound, a titanium halide compound, and an electron donor compound (first electron donor compound) that does not include a phthalic ester structure, and includes a diol skeleton, and the organosilicon compound does not include a vinyl group, and includes at least one group selected from an alkoxy group and an amino group, exhibited excellent catalytic activity during polymerization in the same manner as in the case where a phthalic acid ester is used as an electron donor compound, and could easily and inexpensively produce an olefin polymer exhibiting excellent stereoregularity and excellent bulk density, and having a particle size distribution in which the fine powder content and the coarse powder content were reduced, although the olefin polymerization catalysts included an electron donor compound other than a phthalic acid ester, and the organosilicon compound.

As is clear from the results listed in Tables 1 to 3, the olefin polymerization catalysts obtained in Comparative Examples 1 to 12 that were produced in an inert gas atmosphere (e.g., nitrogen atmosphere) without using a vinylsilane compound (i.e., produced without using a specific component), or produced by performing a washing treatment after the vinylsilane compound had been added to the reaction system, in which the vinylsilane compound having a weak coordination capability was removed, and the polymerization active sites were not protected, a polymerization reaction suddenly started when the olefin polymerization catalyst was brought into contact with an olefin (e.g., propylene), and breakage of the particles and deactivation of the active sites occurred, whereby a significant decrease in polymerization activity, and an increase in the fine powder content and the coarse powder content occurred.

INDUSTRIAL APPLICABILITY

The embodiments of the invention thus provide a method for producing an olefin polymerization catalyst that can produce an olefin polymerization catalyst that exhibits excellent catalytic activity during polymerization, and can produce an olefin polymer that exhibits excellent stereoregularity and excellent bulk density, and has a particle size distribution in which the fine powder content and the coarse powder content are reduced, even when an electron donor compound other than a phthalic acid ester is used, and a method for producing an olefin polymer that can easily and inexpensively produce an olefin polymer using an olefin polymerization catalyst produced using the above method.

The invention claimed is:

1. A method for producing an olefin polymerization catalyst comprising bringing a solid catalyst component for olefin polymerization, a vinylsilane compound, an organosilicon compound, and an organoaluminum compound into contact with each other in an inert organic solvent under an inert gas atmosphere in the absence of a compound represented by a general formula (I), wherein a washing treatment is not performed after the vinylsilane compound has been added to a reaction system, the solid catalyst component comprises a magnesium compound, a titanium halide compound, and an electron donor compound that does not comprise a phthalic acid ester structure, and comprises a diol skeleton, and the organosilicon compound does not comprise a vinyl group, and comprises at least one group selected from an alkoxy group and an amino group, $$CH_2=CH-R^1 \quad (I)$$

wherein $R^1$ is a hydrogen atom or a hydrocarbon residue having 1 to 20 carbon atoms, wherein the vinylsilane compound is a compound represented by a general formula (II), $$(CH_2=CH-)SiR^2R^3R^4 \quad (II)$$

wherein $R^2$, $R^3$, and $R^4$ are independently a halogen atom, or a group selected from a group derived from a saturated hydrocarbon compound having 1 to 10 carbon atoms, a group derived from a halogen-containing saturated hydrocarbon compound having 1 to 10 carbon atoms, a group derived from an aromatic hydrocarbon compound having 6 to 20 carbon atoms, and a group derived from a halogen-containing aromatic hydrocarbon compound having 6 to 20 carbon atoms, provided that $R^2$, $R^3$, and $R^4$ are either identical to or different from each other.

2. The method for producing an olefin polymerization catalyst according to claim 1, wherein the electron donor compound that does not comprise a phthalic acid ester structure, and comprises a diol skeleton, is a first electron donor compound that does not comprise a phthalic acid ester structure, and comprises a diol skeleton, and the solid catalyst component for olefin polymerization further comprises a second electron donor compound as the electron donor compound, the second electron donor compound not comprising a phthalic acid ester structure and a diether structure, and comprising two or more electron donor groups selected from an ester group, an ether group, a carbonate group, and an amino group.

3. The method for producing an olefin polymerization catalyst according to claim 1, wherein the electron donor compound that does not comprise a phthalic acid ester structure, and comprises a diol skeleton, is a first electron donor compound that does not comprise a phthalic acid ester structure, and comprises a 1,3-diether structure, and the solid catalyst component for olefin polymerization further comprises a second electron donor compound as the electron donor compound, the second electron donor compound not comprising a phthalic acid ester structure and a diether structure, and comprising two or more electron donor groups selected from an ester group, an ether group, a carbonate group, and an amino group.

4. The method for producing an olefin polymerization catalyst according to claim 2, wherein the first electron donor compound is one or more compounds selected from a 2,2-dialkyl-1,3-dialkoxypropane and 9,9-bis(methoxymethyl)fluorene.

5. The method for producing an olefin polymerization catalyst according to claim 3, wherein the first electron donor compound is one or more compounds selected from a 2,2-dialkyl-1,3-dialkoxypropane and 9,9-bis(methoxymethyl)fluorene.

6. The method for producing an olefin polymerization catalyst according to claim 1, wherein the solid catalyst component for olefin polymerization, the vinylsilane compound, the organosilicon compound, and the organoaluminum compound are brought into contact with each other in the inert organic solvent at a temperature of 50° C. or less and a solid catalyst component concentration of 0.01 g/L or more for 1 minute or more.

7. The method for producing an olefin polymerization catalyst according to claim 1, wherein the vinylsilane compound is used in a 0.1 to 15-fold molar quantity with respect to a molar quantity (on a titanium atom basis) of the titanium halide compound included in the solid catalyst component.

8. A method for producing an olefin polymer comprising bringing an olefin polymerization catalyst produced using the method for producing an olefin polymerization catalyst according to claim 1 into contact with one or more compounds selected from compounds represented by a general formula (I), $$CH_2\!=\!CH\!-\!R^1 \qquad (I)$$

wherein $R^1$ is a hydrogen atom or a hydrocarbon residue having 1 to 20 carbon atoms.

9. A method for producing an olefin polymer comprising bringing an olefin polymerization catalyst produced using the method for producing an olefin polymerization catalyst according to claim 2 into contact with one or more compounds selected from compounds represented by a general formula (I), $$CH_2\!=\!CH\!-\!R^1 \qquad (I)$$

wherein $R^1$ is a hydrogen atom or a hydrocarbon residue having 1 to 20 carbon atoms.

10. A method for producing an olefin polymer comprising bringing an olefin polymerization catalyst produced using the method for producing an olefin polymerization catalyst according to claim 3 into contact with one or more compounds selected from compounds represented by a general formula (I), $$CH_2\!=\!CH\!-\!R^1 \qquad (I)$$

wherein $R^1$ is a hydrogen atom or a hydrocarbon residue having 1 to 20 carbon atoms.

11. A method for producing an olefin polymer comprising bringing an olefin polymerization catalyst produced using the method for producing an olefin polymerization catalyst according to claim 4 into contact with one or more compounds selected from compounds represented by a general formula (I), $$CH_2\!=\!CH\!-\!R^1 \qquad (I)$$

wherein $R^1$ is a hydrogen atom or a hydrocarbon residue having 1 to 20 carbon atoms.

12. A method for producing an olefin polymer comprising bringing an olefin polymerization catalyst produced using the method for producing an olefin polymerization catalyst according to claim 5 into contact with one or more compounds selected from compounds represented by a general formula (I), $$CH_2\!=\!CH\!-\!R^1 \qquad (I)$$

wherein $R^1$ is a hydrogen atom or a hydrocarbon residue having 1 to 20 carbon atoms.

13. A method for producing an olefin polymer comprising bringing an olefin polymerization catalyst produced using the method for producing an olefin polymerization catalyst according to claim 6 into contact with one or more compounds selected from compounds represented by a general formula (I), $$CH_2\!=\!CH\!-\!R^1 \qquad (I)$$

wherein $R^1$ is a hydrogen atom or a hydrocarbon residue having 1 to 20 carbon atoms.

14. A method for producing an olefin polymer comprising bringing an olefin polymerization catalyst produced using the method for producing an olefin polymerization catalyst according to claim 7 into contact with one or more compounds selected from compounds represented by a general formula (I), $$CH_2\!=\!CH\!-\!R^1 \qquad (I)$$

wherein $R^1$ is a hydrogen atom or a hydrocarbon residue having 1 to 20 carbon atoms.

\* \* \* \* \*